United States Patent

[11] 3,627,390

| [72] | Inventor | Arthur S. Irwin<br>Jamestown, N.Y. |
| --- | --- | --- |
| [21] | Appl. No. | 863,041 |
| [22] | Filed | Oct. 2, 1969 |
| [45] | Patented | Dec. 14, 1971 |
| [73] | Assignee | TRW Inc.<br>Cleveland, Ohio |

[54] STATIC SEAL
2 Claims, 4 Drawing Figs.

[52] U.S. Cl...................................................... 308/187.1,
308/36.4, 277/25
[51] Int. Cl...................................................... F16j 15/16,
F16r 41/00
[50] Field of Search.......................................... 277/25,
153, 152; 308/36.4, 187.1

[56] References Cited
UNITED STATES PATENTS

| 2,637,574 | 5/1953 | Diehl............................. | 277/25 |
| --- | --- | --- | --- |
| 3,028,181 | 4/1962 | Thompson et al. ........... | 277/25 X |
| 3,072,413 | 1/1963 | Parks............................. | 277/153 X |
| 3,168,319 | 2/1965 | Paulsen ........................ | 277/25 |

FOREIGN PATENTS

| 507,842 | 6/1939 | Great Britain................ | 277/25 |

*Primary Examiner*—Samuel B. Rothberg
*Attorney*—Hill, Sherman, Meroni, Gross & Simpson ABSTRACT: A static shaft seal for sealing pressure along the axis of a shaft in the absence of shaft rotation. The seal comprises three members, the first of which is a substantially U-shaped cross section ring press-fitted onto the shaft along the inner diameter of the inner leg with the outer leg spaced radially outwardly from the shaft. A second member is carried by the housing and has an annular wall extending between the legs of the U-shaped member. An elastomeric lip seal is bonded to the U-shaped member adjacent the intersection of the bight and outer leg and has a ring portion projecting axially with an outer diameter spaced from the inner diameter of the outer leg. The ring portion terminates in an increased mass portion having a sealing lip around the inner diameter thereof in static contact with the outer diameter of the second member. As the shaft rotates a centrifugal force acting on the increased mass portion causes the sealing lip to lift off of the outer diameter face of the second member.

PATENTED DEC 14 1971  3,627,390
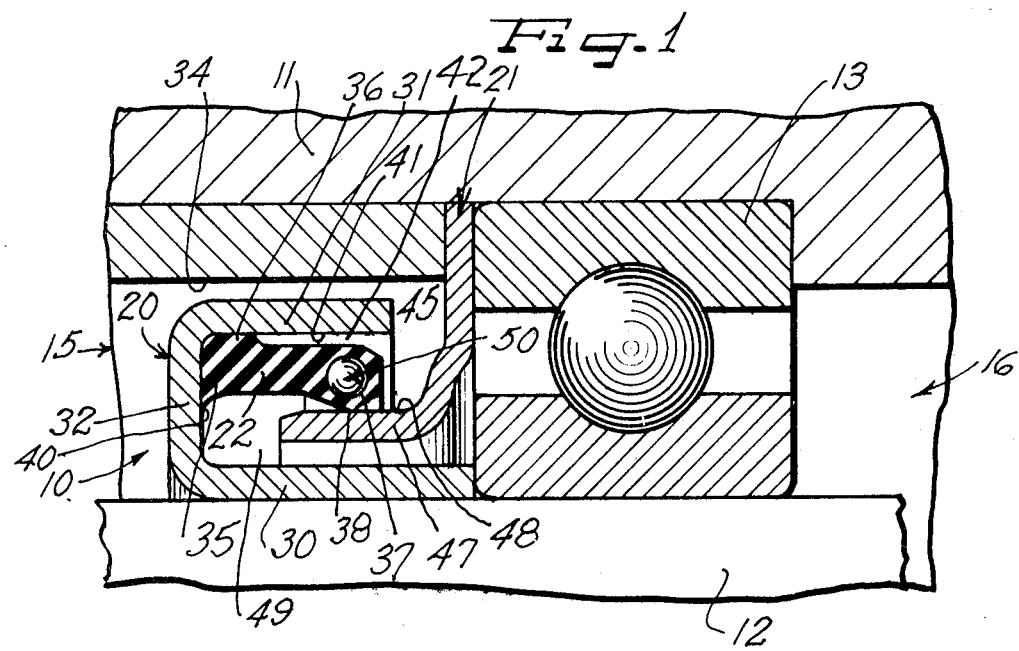
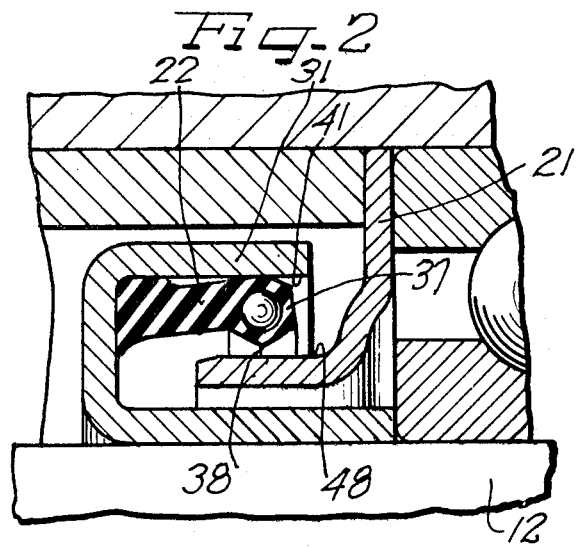
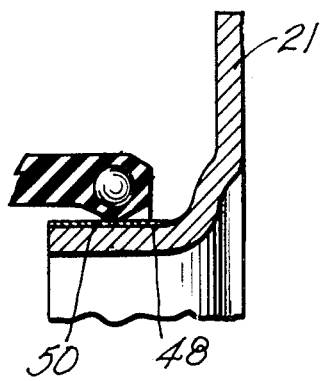
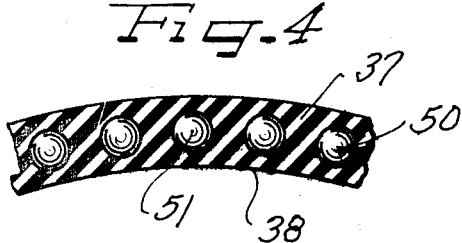
INVENTOR
Arthur S. Irwin
BY *[signature]*
ATTORNEYS

STATIC SEAL

BACKGROUND OF THE INVENTION

1. Field of the Invention

This invention relates to seals and more particularly to a static shaft seal.

2. Prior Art

Numerous types of shaft seals have been designed for sealing pressures along the axial length of a rotating shaft. Many of these designs operate effectively only when the shaft is rotating or when the device, including the rotating shaft, is in operation. For example some designs use pressures generated by operation of the device or by a secondary pressure generator to effectuate a seal. Many such seals to not rely upon face-to-face contact between seal elements to create the seal, and the device is designed to be operated with a minimum of resistance to rotation of the shaft. However, such seals are effective only during rotation of the shaft or operation of the device or secondary pressure generation equipment. When the equipment is shut off or when the shaft creases to rotate, pressure leakage can occur in spite of the presence of such seals.

Inasmuch as the equipment incorporating such seals is usually designed to be operated with a minimum resistance to rotation of the shaft, the use of secondary face seals to prevent leakage during nonoperation of the shaft would adversely affect the operating characteristics of the device when the shaft is rotating.

SUMMARY OF THE INVENTION

This invention overcomes the disadvantages of the prior art by providing a static contact seal which is effective to prevent pressure loss when the shaft is not rotating but which disengages itself from contact with nonrotating elements when the shaft is rotating. In this manner the seal does not adversely affect the operating characteristics of the device but does create a satisfactory seal when the device is not operating.

The static seal in my invention consists of a shaft carried U-shaped cross section rigid ring member whose inner diameter rides on the shaft in engagement therewith. The backwall of the bight is positioned on the high-pressure side of the seal assembly. The bight section extends radially outwardly from the inner leg and terminates in the radially outermost leg which projects axially.

An elastomeric ring member is bonded to the inner wall of the bight section and the inner diameter of the outer leg adjacent the junction with the bight. The elastomeric ring member projects axially beyond the bonding point away from the bight and terminates in an end portion having associated therewith a sealing rib on its inner diameter. The end portion of the elastomeric member has a plurality of circumferentially spaced mass increasing balls embedded therein.

A secondary rigid member is carried by the housing and has a radial portion extending radially inward towards the shaft and an axial portion extending into the area between the two legs of the U-shaped cross section member. The sealing rib of the elastomeric seal normally rides against the outer diameter face of this axial portion in sealing contact therewith. Because the free area on the inner diameter of the elastomeric member which is exposed to the low-pressure side of the assembly is less than the free area of the inner diameter which is exposed to the high-pressure side of the assembly while a portion of the outer diameter of the elastomeric member is exposed to the high pressure side, the elastomeric member will be pressure forced into contact with the outer diameter of the axial portion of the second rigid member to maintain an effective seal.

When the shaft begins to rotate, the U-shaped cross section member and the elastomeric seal will be carried therewith. As rotation speed builds up, the centrifugal force acting against the increased mass end of the elastomeric member will cause it to be expanded outwardly away from contact with the second rigid member thereby breaking the seal. Radial movement away from the shaft by the elastomeric member will be limited by contact with the outer leg of the U-shaped cross section member. Therefore, the seal of my invention will effectively prevent pressure leakage across the seal assembly when the shaft is not rotating and will disengage itself when the shaft is rotating so as to eliminate friction resistance to rotation.

It is therefore an object of this invention to provide a contact type static shaft seal wherein the contact is broken during shaft rotation.

It is a further and more important object of this invention to provide a shaft seal assembly having a face-to-face sealing area preventing pressure leakage across the seal assembly when the shaft is not rotating which breaks face-to-face contact in response to shaft rotation.

It is yet another and more specific object of this invention to provide a static seal for rotary shafts having a member with an axially extending wall spaced from the shaft and radially extending wall contacting the shaft with an elastomeric ring member projecting from the radially extending wall in close space relation to the axially extending wall between the shaft and the axially extending wall, the elastomeric member having an increased mass portion at the end thereof and a sealing lip on the radially inner face thereof in contact with a stationary housing carried member having an axially extending portion interfitted between the sealing lip and the shaft whereby the sealing lip is in sealing engagement with the stationary axially extending member when the shaft is not rotating and whereby the elastomeric member is expanded outwardly against the first axially extending member due to centrifugal force when the shaft is rotating to break the seal between the lip and the stationary axially extending member.

BRIEF DESCRIPTION OF THE DRAWINGS

FIG. 1 is a fragmentary cross-sectional view of the static seal of this invention in place adjacent a bearing on a rotatable shaft received in a housing.

FIG. 2 is a view similar to FIG. 1 illustrating operation of the static seal while the shaft is rotating.

FIG. 3 is a fragmentary cross-sectional view of a modification of the static seal of FIGS. 1 and 2 illustrating only the stationary member and the elastomeric member.

FIG. 4 is a fragmentary cross-sectional view of end portion of the elastomeric member illustrating placement of the mass increasing balls therein.

DESCRIPTION OF THE PREFERRED EMBODIMENTS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 illustrates the static seal assembly 10 of my invention positioned in a housing 11 through which a rotating shaft 12 is journaled. An antifriction bearing assembly 13 supports the shaft in the housing 11 and the static seal assembly 10 is illustrated as being positioned adjacent the bearing assembly 13.

The static seal 10 of my invention is designed to be used in association with a running seal (not illustrated) of the type which sufficiently prevents flow from the high-pressure side 15 to the low-pressure side 16 of the housing when the device is in operation. Such seals are commonly used in water pumps, lubricated motors, and the like and may be of numerous types and designs. However, many such running seals do not effectively seal against leakage when the shaft is not rotating, either because they rely upon an auxiliary device to effectuate sealing, such as secondary pressure seals which rely upon a pumped-in pressure from a secondary pressure source to effectuate a seal, or, because they are dependent upon shaft rotation to effect the seal, such as minimum gap seals. Where the pressure to be sealed in dependent solely upon rotation of the shaft or operation of the device, this may not present any problems inasmuch as turning off the device terminates the pressure differential. However, in devices containing lubricants or devices which are utilized to act upon fluids at a pressure, deactivation of the device can allow the fluid or lubricant to escape through the inoperative seal. In those instances it is desirable to have a static seal, i.e., one which works when the device is at rest.

In many instances, static seals can be used in cooperation with seals of a different type even while the device is running. However, it is often desirable to operate a device with a minumum amount of drag. A face contact static seal, which continues contact during operation of the device, will impose such an undesirable drag or friction resistance on the operation of the device. Therefore, continuous contact seals are disadvantageous in such devices. My invention is designed to provide an effective contact seal during those periods of time in the operating cycle of the device when a secondary seal member may be ineffective but which disassociates itself from the face contact during those periods of time in which the secondary seal is effective. This is accomplished by using the centrifugal force created by rotation of the shaft to cause a disengagement of the sealing face contact between the seal members.

The seal assembly 10 consists of a shaft-carried member 20, a housing carried member 21 and an elastomeric seal member 22.

The shaft-carried member 20 is illustrated as being a U-shaped cross section annular ring encircling the shaft 12. The inner diameter leg 30 thereof is axially longer than the outer diameter leg 31 and is press-fitted onto the outer diameter of the shaft 12. It is to be understood that this is by way of illustration only and that the shaft-carried member 20 can be affixed to the shaft by other methods and may have a configuration other than the illustrated U-shaped configuration.

The radially extending bight portion 32 of the shaft-carried member 20 is positioned at the high pressure side 15 of the seal assembly with the legs 30 and 31 extending axially therefrom in the direction of the low pressure side 16. The radially outermost leg 31 extends from the bight portion 32 in an axial direction and is spaced from the radially innermost leg 30 and from the inner diameter of wall 34 of the housing 11.

The elastomeric member 22 is substantially an axially extending elastomeric ring with its high pressure axial end 35 having a radially outwardly thickened portion 36 and its low pressure end having a V-shaped radially inwardly thickened portion 37. The sealing lip 38 is at apex of the "V." The high pressure end 35 is bonded to the inner surface 40 of the radially extending bight portion 32 and the inner diameter wall 41 of the radially outermost leg 31 adjacent the bight intersection. This provides an annular cavity 42 between the outer diameter of the elastomeric member 22 and the inner diameter wall 41 of the radially outermost leg 31. The cavity is closed on the high pressure end by the radially thickened portion 36 and is opened on the low pressure end to the exterior of the U-shaped cross section shaft carried member 20.

The stationary housing member 21 has a radially extending portion 46 attached to the housing 11, which terminates in an axially extending portion 47. The axially extending portion 47 projects into the space 49 between the radially innermost leg 30 and the elastomeric member 22 where the sealing lip or rib 38 bottoms on the radially outermost face 48 thereof. The assembly is preferably dimensioned such that the sealing lip circumferentially engages the face 48 with a constrictive force sufficient to assure a tight seal.

The seal is pressure responsive in that the housing carried member 21 provides a labyrinth between the high-pressure side 15 and the low-pressure side 16 of the assembly so that pressure in order to escape will have to pass between the radially outermost leg 31 and the axially extending portion of the stationary member 47 and thence around the end of the member 47 and back between the axially extending portion 47 and the radially innermost leg 30. Because the pressure flow is blocked by the elastomeric member 22 and because the surface area of the elastomer which is exposed to the high pressure on the radially outermost side thereof is less than the surface area of the elastomer exposed to the high pressure on the radially innermost side thereof, the elastomeric member will be pressure biased radially inwardly into increased sealing contact with the face 48.

In order to increase the mass of the radially inwardly thickened end 37 a plurality of circumferentially spaced mass increasing inserts 50 are embedded in the elastomer.

FIG. 4 illustrates the mass increasing members 50 as being a series of circumferentially spaced metallic balls 51 which are embedded in the elastomer radially outwardly from the sealing rib 38 in the radially inwardly increased mass portion 37 of the elastomeric member. Because the balls 51 are circumferentially spaced and embedded in the elastomer, they do not adversely affect the ability of the elastomer to stretch. Because the elastomer can stretch, rotation of the shaft 12 will cause the end 37 of the elastomeric sealing member 22 to be expanded outwardly away from the face 48 of the stationary member 21. This is due to the centrifugal force acting on the elastomeric end due to the provision of the increased mass balls. As the elastomeric member moves away from the face 48 contact will be broken between the sealing rib 38 and the face 48 thus breaking the seal. Movement of the end 37 of the elastomeric member 22 is limited by contact with the inner diameter face 41 of the outer leg 31. Thus when the shaft 12 has reached a sufficient speed of rotation to cause the elastomer to stretch and thus circumferentially expand away from the face 47, the seal will be broken and there will be no frictional drag imposed by the seal assembly 10 to reduce the effectiveness of the device as there would be if the seal were a continuous face contact seal.

As illustrated in FIG. 3 in a modification of this invention a coating 50 may be placed on the face 48 of the stationary member 21. The coating may either be a friction reducing material which will allow the elastomeric seal to slip on the face 48 at the initial start of rotation of the shaft 12 and which will reduce rubbing against the sealing rib 38 when the shaft slows down or which may be an increased friction material which will cooperate with the sealing rib 38 to effectuate a greater seal.

Placement of the balls 51 and selection of the mass thereof together with the selection of the stiffness of the elastomer and the initial circumferential stretching which it undergoes in being fitted around the stationary member 47 can all be chosen so as to provide a seal which will remain in sealing contact until the shaft has reached a given rotational speed thus allowing the static seal of my invention to continue to effectively seal the device until it has reached a stage of operation where a secondary operating seal, such as a gap seal, will become effective. Thus will also allow the sealing assembly 10 to effectuate a seal before the shaft has reached zero angular velocity during shutdown of the device. Thus the secondary seal can be designed to operate most efficiently at high speeds without the loss of design efficiency otherwise required in attempting to make the secondary seal also effective at slow speeds.

Although the member 22 has been described as being constructed of an elastomer, it is to be understood that is can be constructed of any material, such as a plastic, which can accommodate a slight stretch. It is further to be understood that the dimensions of the drawings are for illustrative purposes only and that the seal may be effectively utilized in embodiments where the sealing member 22 will be required to move only a very small fraction of an inch.

It can therefore be seen from the above that my invention provides for a rotating shaft seal which effective only when the shaft is at rest or revolving with a slow speed and which thereafter opens up so as not to create a frictional drag during operation of the shaft connected device.

Although the teachings of my invention have herein been discussed with reference to specific theories and embodiments, it is to be understood that these are by way of illustration only and that others may wish to utilize my invention in different designs or applications.

I claim:

1. A static shaft seal and antifriction bearing assembly combination for use in connection with a rotatable shaft received through a nonrotatable portion of a housing comprising an antifriction bearing assembly mounted on a shaft including an inner ring portion projecting radially from the shaft surface, a rigid U-shaped cross section ring having the inner diameter leg thereof press-fitted onto the shaft for rotation therewith, the bight portion of the "U" projecting radially from the shaft and the outer diameter leg of the "U" extending axially with respect to the shaft having its inner diameter radially spaced therefrom and its outer diameter spaced from the housing, the inner diameter leg of the "U" being axially longer than the outer diameter leg, the inner diameter leg terminating in a radial end wall in abutment relation with the inner ring of the bearing assembly whereby the spacing of the bight portion of the "U" from the bearing assembly is predetermined by the axial length of the inner diameter leg of the "U," an elastomeric axially extending ring having a radially outwardly thickened portion at one end thereof, the said end bonded to the bight, the outer diameter of the thickened portion bonded to the inner diameter of the outer diameter leg of the "U," the elastomeric ring received between the inner and outer legs of the U-shaped cross section member, an inner diameter sealing lip on said elastomeric ring adjacent the axial end thereof opposite the bonded end, the outer diameter of the axial end opposite the bonded end being tapered, the outer diameter of said elastomeric ring axially beyond the radially outwardly thickened portion spaced from portions of the inner diameter of the outer leg, the inner diameter of said elastomeric ring spaced from the inner diameter leg, a rigid housing carried stationary member, said stationary member being ring shaped and having an axial bore therethrough, an axially extending ring portion adjacent the bore integral with a radially extending ring portion at one end thereof, said axially extending portion projecting into the space between the inner diameter leg and the elastomeric member, the sealing lip normally in circumferential sealing engagement with the outer diameter of the axially extending stationary member, means increasing the mass of portions of the elastomeric member adjacent the sealing lip, said means positioned radially outwardly of the lip, the said elastomeric member circumferentially expansible, the stationary member preventing pressured flow along the axis of said shaft between the shaft and the housing except through the double reverse path between the U-shaped cross section member and the stationary member, the elastomeric member effective to block said path when the seal lip is in circumferential engagement with the outer diameter of the radially extending portion of the stationary member, and the elastomeric member responsive to rotation of the shaft to break the said sealing contact with the stationary member due to centrifugal forces acting against the increased mass portions and the said outer diameter leg limiting circumferential expansion of said elastomeric member.

2. The seal of claim 1 wherein the said means for increasing the mass comprise a plurality of circumferentially spaced members embedded in the elastomeric member, the said circumferentially spaced members having a mass-to-volume ratio greater than the mass-to-volume ratio of the elastomeric member.

* * * * *